(12) United States Patent
Kanakapura et al.

(10) Patent No.: US 12,164,974 B2
(45) Date of Patent: Dec. 10, 2024

(54) MANAGING WORKLOAD EXECUTION ACROSS MULTIPLE DIFFERING INFORMATION HANDLING SYSTEMS UTILIZING THERMAL PROFILES

(71) Applicant: Dell Products L.P., Round Rock, TX (US)

(72) Inventors: Ravishankar N. Kanakapura, Bangalore (IN); Raveendra Babu Madala, Bangalore (IN); Sivakumar Swamy, Bangalore (IN); Rishi Mukherjee, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 766 days.

(21) Appl. No.: 17/443,918

(22) Filed: Jul. 28, 2021

(65) Prior Publication Data

US 2023/0042338 A1 Feb. 9, 2023

(51) Int. Cl.
| | |
|---|---|
| *G06F 9/46* | (2006.01) |
| *G06F 1/20* | (2006.01) |
| *G06F 9/48* | (2006.01) |
| *G06F 9/50* | (2006.01) |
| *G06F 9/455* | (2018.01) |

(52) U.S. Cl.
CPC .......... *G06F 9/5094* (2013.01); *G06F 1/206* (2013.01); *G06F 9/4893* (2013.01); *G06F 9/5077* (2013.01); *G06F 9/5083* (2013.01); *G06F 9/45558* (2013.01); *G06F 2209/5022* (2013.01); *G06F 2209/505* (2013.01)

(58) Field of Classification Search
None
See application file for complete search history.

(56) References Cited

U.S. PATENT DOCUMENTS

| | | | | |
|---|---|---|---|---|
| 8,086,359 | B2 * | 12/2011 | Spiers | G05D 23/1932 702/132 |
| 2016/0291654 | A1 * | 10/2016 | Iyer | G06F 1/206 |
| 2019/0313552 | A1 * | 10/2019 | Curtis | H05K 7/20836 |

* cited by examiner

*Primary Examiner* — Bing Zhao
(74) *Attorney, Agent, or Firm* — McDermott Will & Emery LLP

(57) ABSTRACT

In one or more embodiments, one or more systems, one or more methods, and/or one or more processes may determine first thermal attribute values associated with multiple information handling systems (IHSs) with respect to a period of time as the IHSs execute a first workload; determine multiple variance ranges respectively associated with the first thermal attributes; periodically determine second thermal attribute values associated with the IHSs as the IHSs execute a second workload; determine that a thermal attribute value of the second thermal attribute values exceeds a respective variance range of the variance ranges as a first information handling system (IHS) of the IHSs executes the second workload; generate an alert based at least on the thermal attribute value exceeding the respective variance range; and in response to the alert, transfer at least a portion of the second workload from the first IHS to a second IHS of the IHSs.

20 Claims, 6 Drawing Sheets

MANAGING WORKLOAD EXECUTION ACROSS MULTIPLE DIFFERING INFORMATION HANDLING SYSTEMS UTILIZING THERMAL PROFILES

BACKGROUND

Field of the Disclosure

This disclosure relates generally to information handling systems and more particularly to utilizing thermal profiles associated with workload executing on information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute a first workload on multiple information handling systems; may determine first multiple thermal attribute values associated with the multiple information handling systems with respect to a period of time as the multiple information handling systems execute the first workload; may determine multiple variance ranges respectively associated with the multiple thermal attributes; may execute a second workload on the multiple information handling systems; may periodically determine second multiple thermal attribute values associated with the multiple information handling systems as the multiple information handling systems execute the second workload; may determine that a thermal attribute value of the second multiple thermal attribute values exceeds a respective variance range of the multiple variance ranges as a first information handling system of the multiple information handling systems execute the second workload; in response to determining that the thermal attribute value of the second multiple thermal attribute values exceeds the respective variance range, may generate an alert based at least on the thermal attribute value exceeding the respective variance range; and in response to the alert, may transfer at least a portion of the second workload from the first information handling system to a second information handling system of the multiple information handling systems. In one or more embodiments, the one or more systems, the one or more methods, and/or the one or more processes may further, in response to the alert, provide a message to a user indicating that the thermal attribute value of the second multiple thermal attribute values exceeds the respective variance range.

In one or more embodiments, transferring the at least the portion of the second workload from the first information handling system to the second information handling system may include transferring the second workload from the first information handling system to the second information handling system. For example, the second workload may include a virtual machine. In one or more embodiments, the thermal attribute value of the second multiple thermal attribute values may include a fan speed of a fan of the first information handling system, a temperature value of a processor of the first information handling system, or a ratio of an inlet temperature value to an outlet temperature value associated with the first information handling system. For example, the thermal attribute value of the second multiple thermal attribute values may include the ratio of the inlet temperature value to the outlet temperature value associated with the first information handling system. For instance, the first information handling system may include multiple sensors, in which a first sensor of the multiple sensors is located at or near an air inlet of the first information handling system and is configured to determine the inlet temperature value and in which a second sensor of the multiple sensors is located at or near an air outlet of the first information handling system and is configured to determine the outlet temperature value.

In one or more embodiments, a cluster may include the multiple information handling systems. For example, the cluster may include a cluster manager. For instance, transferring the at least the portion of the second workload from the first information handling system to the second information handling system may include the cluster manager transferring the at least the portion of the second workload from the first information handling system to the second information handling system in response to the alert. In one or more embodiments, the multiple information handling systems may include respective multiple baseboard management controllers. For example, the cluster manager may provide, to the multiple baseboard management controllers, multiple requests for multiple inventories respectively associated with the multiple information handling systems; and may receive the multiple inventories respectively associated with the multiple information handling systems.

In one or more embodiments, the first information handling system may include a baseboard management controller. For example, determining that the thermal attribute value of the second multiple thermal attribute values exceeds the respective variance range may include the baseboard management controller determining that the thermal attribute value of the second multiple thermal attribute values exceeds the respective variance range. For instance, the baseboard management controller may provide the alert to the cluster manager. In one or more embodiments, the cluster manager may provide the multiple variance ranges to the baseboard management controller. In one or more embodiments, determining that the thermal attribute value of the second multiple thermal attribute values exceeds the respective variance range may include determining that the thermal attribute value of the second multiple thermal attribute values exceeds the respective variance range for an amount of time transpiring.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
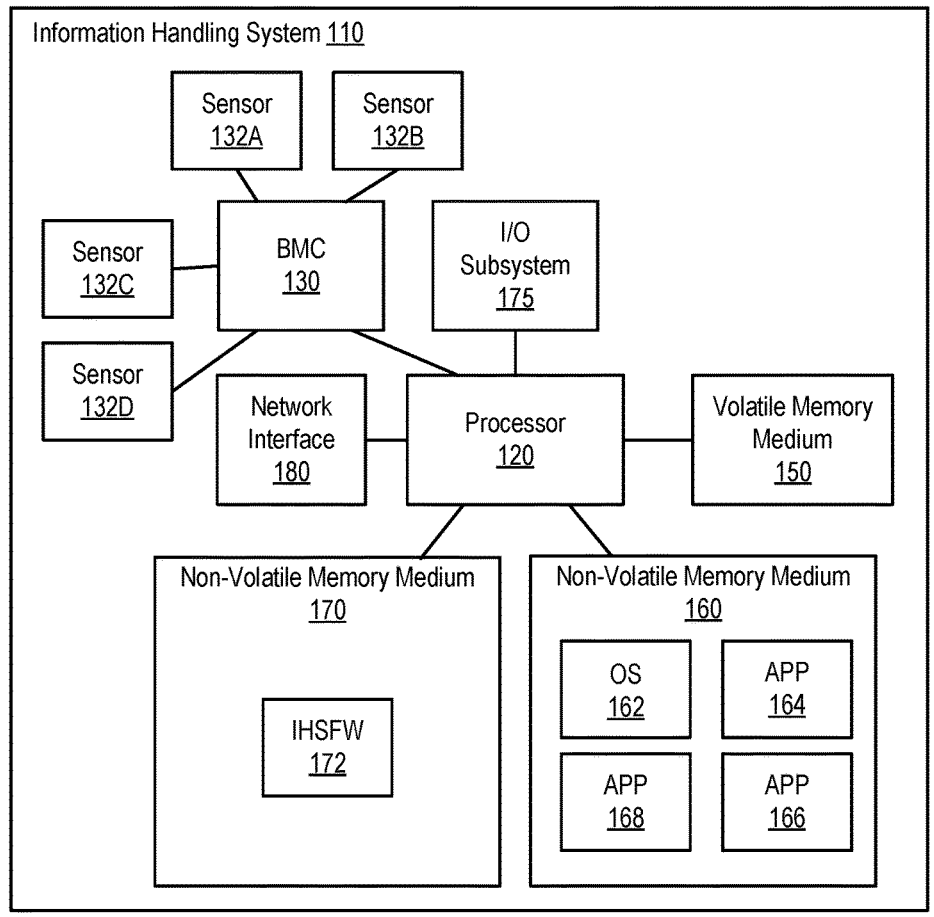
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a datacenter may remove heat from information handling systems. For example, a cooling system associated with the datacenter may be utilized to remove heat from the information handling systems and/or to cool the information handling systems. In one or more embodiments, an information handling system may include one or more sensors. For example, the one or more sensors may be utilized in determining one or more temperature values at one or more physical locations within the information handling system. In one or more embodiments, one or more alerts may be generated based at least on the one or more temperature values. For example, the one or more alerts may be generated based at least on one or more deviations from one or more temperature ranges. For instance, the one or more alerts may be provided to one or more applications, which may perform one or more actions based at least on the one or more alerts.

In one or more embodiments, the cooling system associated with the datacenter may provide cooling in response to the one or more alerts. In one example, the cooling system may increase a volumetric airflow rate at or near an information handling system associated with the one or more alerts. In another example, the cooling system may lower a temperature of air at or near an information handling system associated with the one or more alerts. In one or more embodiments, an application executed by the information handling system may cause the information handling system to generate heat. For example, a first application executed by the information handling system may cause the information handling system to generate a first amount of heat, and a second application executed by the information handling system may cause the information handling system to generate a second amount of heat. For instance, the first amount of heat may be greater than the second amount of heat.

In one or more embodiments, one or more systems, one or more methods, and/or one or more processes may implement thermal management of the information handling system based at least on a workload of the information handling system. For example, one or more thermal characteristics associated with the workload may be determined based at least on one or more temperature values while the workload is executed on the information handling system. For instance, a machine learning process may determine the one or more thermal characteristics associated with the workload based at least on one or more temperature values while the workload is executed on the information handling system. In one or more embodiments, the machine learning process may determine a thermal profile associated with the workload based at least on the one or more thermal characteristics associated with the workload. For example, the thermal profile associated with the workload may be deemed a golden profile for that workload.

In one or more embodiments, a first information handling system may be different from a second information handling system. For example, the workload may be associated with multiple different thermal profiles based at least on executing the workload on multiple different information handling systems. In one instance, the workload may be associated with a first thermal profile when the workload is executed on a first information handling system. In another instance, the workload may be associated with a second thermal profile, different from the first thermal profile, when the workload is executed on a second information handling system, different from the first information handling system.

In one or more embodiments, a golden profile associated with a workload may be adjusted based at least on one or more characteristics associated an information handling system that may be utilized to process the workload. In one example, a first thermal profile associated with the workload may be determined based at least on the golden profile associated with the workload and one or more characteristics associated a first information handling system that may be utilized to process the workload. In another example, a second thermal profile associated with the workload may be determined based at least on the golden profile associated with the workload and one or more characteristics associated a second information handling system that may be utilized to process the workload. For instance, if at least one of the one or more characteristics associated the second information handling system is different from at least one of the one or more characteristics associated the second information handling system, the second thermal profile associated with the workload may be different from the first thermal profile associated with the workload.

In one or more embodiments, the cooling system of the datacenter may consume a portion of an entire energy consumption of the datacenter. For example, the cooling system of the datacenter may consume approximately ten percent (10%) of the entire energy consumption of the datacenter. In one or more embodiments, maintaining a thermal coefficient between hot isles and cool isles of the datacenter may be a factor in maintaining an optimal load on the cooling system associated with the datacenter, which may affect power consumption of the cooling system.

In one or more embodiments, monitoring a workload utilizing a thermal profile associated with the workload may yield a uniform resource utilization and an optimal thermal coefficient between hot isles and cool isles of the datacenter associated with a cluster of information handling systems. For example, the information handling systems may be homogeneous information handling systems. For instance, the homogeneous information handling systems may include same or similar components. In one or more embodiments, this may provide an optimal load on the cooling system. For example, the optimal load on the cooling system may optimize a carbon footprint associated with the datacenter.

In one or more embodiments, one or more thermal profiles may be updated based at least on one or more thermal behaviors of homogeneous information handling systems in a cluster that execute similar workloads. For example, the one or more thermal profiles may be updated based at least on a type of an information handling system, a configuration of the information handling system, a cluster grouping based at least on workload type, workload distribution over time, an inlet and outlet temperature value variance associated with a time period, and a volumetric of airflow rate for the time period, among others.

In one or more embodiments, the one or more thermal profiles may be iteratively updated based at least on actual deviations from initially determined values. For example, the one or more thermal profiles may be iteratively updated based at least on a percentage of information handling systems associated with a cluster deviating from the initially determined thermal profile values. For instance, a thermal profile may be iteratively updated as shown in Table 1.

profile, it may be permitted if: the workload over time is within the first tolerance (e.g., plus or minus the first tolerance of the workload over time of the golden profile), the ratios of inlet temperature values and outlet temperature values are within the second tolerance (e.g., plus or minus the second tolerance of the ratios of inlet temperature values and outlet temperature values of the golden profile), and the fan speeds are within the third tolerance (e.g., plus or minus the third tolerance of the fan speeds of the golden profile).

In one or more embodiments, if an attribute of the thermal profile is determined not to be within an associated tolerance, an alert may be generated. For example, receiving the alert may mitigate or eliminate an increase in a cooling power requirement for the information handling system processing the workload. For instance, a damaged or malfunctioning fan of the information handling system may cause the alert to be generated. As an example, the fan may be repaired, serviced, or replaced rather than having additional cooling from the datacenter applied to the information handling system. As another example, a cluster manager may not provide an additional workload to the information handling system until an issue associated with the alert is addressed. For instance, that action, and other possible one or more actions, may assist and/or aid in maintaining a thermal compliance for the cluster of information handling systems. In one or more embodiments, if no issue is determined to be associated with the alert, a variance may be modified. For example, if no issue is determined to be associated with the alert, the user (e.g., the administrator) may adjust the variance. In one or more embodiments, an original equipment manufacturer (OEM) may publish one or more policies associated with volumetric airflow rates and thermal profiles for information handling systems associated with a type of workload, among others. For example, this may be further enhanced with real time data, where in an initial golden reference may be replaced with measured reference data.

TABLE 1

| Workload % | Inlet/outlet temperature value ratio | Volumetric airflow rate | Fan speed |
|---|---|---|---|
| 10-70 (step by 5%) | Initially from vendor information handling system statistics and later iterated over time as per actual values | Initially from vendor information handling system statistics and later iterated over time as par actual | Initially from vendor information handling system statistics and later iterated over time as per actual values |

In one or more embodiments, a variance associated with a thermal profile may be configured. For example, a user (e.g., an administrator) may configure the variance associated with the thermal profile. In one or more embodiments, the thermal profile may include multiple attributes. For example, the multiple attributes may include a workload over time, ratios of inlet temperature values and outlet temperature values, and fan speeds, among others.

In one or more embodiments, the variance associated with the thermal profile may include multiple tolerances respectively associated with the multiple attributes. For example, the multiple tolerances may include a first tolerance associated with the workload over time, a second tolerance associated with the ratios of inlet temperature values and outlet temperature values, and a third tolerance associated with the fan speeds. For instance, as an information handling system processes the workload associated with the thermal In one or more embodiments, a management console may determine that multiple information handling systems are included in a cluster. The management console may determine inventories of the information handling systems. For example, the management console may poll respective baseboard management controllers of the information handling systems to determine inventories of the information handling systems. For example, the baseboard management controllers may provide component information associated with the respectively associated information handling systems to the management console.

In one or more embodiments, the management console may determine inlet temperature values, outlet temperature values, fan speeds, and volumetric air flow rates at time intervals (e.g., periodic time intervals) for the respective information handling systems. For example, the baseboard management controllers may provide sensor data associated with the respectively associated information handling systems to the management console. For instance, management console may determine the inlet temperature values, the outlet temperature values, the fan speeds, and the volumetric airflow rates based at least on the sensor data from the baseboard management controllers.

In one or more embodiments, the management console may determine workloads executing on the information handling systems at the time intervals (e.g., the periodic time intervals). For example, the management console may utilize the baseboard management controllers to determine workloads executing on the information handling systems at the time intervals. For instance, the baseboard management controllers may delegate acquiring information associated with the workloads to executables, executing in an operating system environment on the respective information handling systems.

In one or more embodiments, the executables may delegate acquiring information associated with the workloads to operating systems executing on the respective information handling systems. For example, the executables may receive information associated with the respective workloads and may provide the information associated with the respective workloads to the respective baseboard management controllers, which may provide the information associated with the respective workloads to the management console.

In one or more embodiments, the management console may build and/or update one or more thermal profiles associated with the workloads. For example, the management console may build and/or update one or more thermal profiles associated with the workloads based at least on the information associated with the respective workloads and the inlet temperature values, the outlet temperature values, the fan speeds, and the volumetric airflow rates, among others. For instance, the one or more thermal profiles may be determined and/or updated as the information handling system process the workloads.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a volatile memory medium 150, non-volatile memory media 160 and 170, an I/O subsystem 175, and a network interface 180. As illustrated, BMC 130, volatile memory medium 150, non-volatile memory media 160 and 170, I/O subsystem 175, and network interface 180 may be communicatively coupled to processor 120.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O BMC 130, subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, an information handling system may include one or more sensors. For example, IHS 110 may include sensors 132A-132C. For instance, sensors 132A-132C may be communicatively coupled to BMC 130. Although IHS 110 is show as including sensors 132A-132C, IHS 110 may include any number of sensors 132, according to one or more embodiments.

In one or more embodiments, a sensor 132 may transform one or more physical phenomena into one or more signals. In one example, a sensor 132 may transform physical one or more phenomena into one or more analog signals and may provide the one or more analog signals to BMC 130. For instance, BMC 130 may receive the one or more analog signals. In another example, a sensor 132 may transform physical one or more phenomena into one or more digital signals and may provide the one or more digital signals to BMC 130. For instance, BMC 130 may receive the one or more digital signals. In one or more embodiments, a sensor 132 may provide temperature values to BMC 130 via the one or more signals. In one example, a sensor 132 may transform one or more temperatures into one or more voltage signals, which may be provided to BMC 130. In another example, a sensor 132 may transform one or more temperatures into digital data, which may be provided to BMC 130.

Figure 1B:
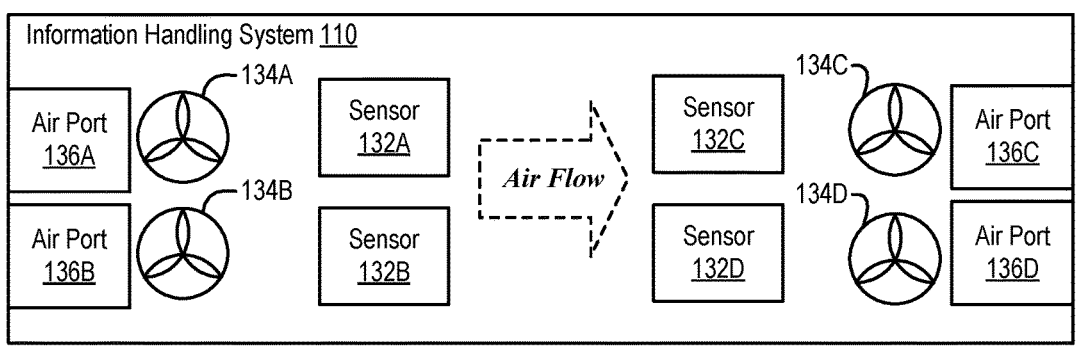
FIG. 1B illustrates another example of an information handling system, according to one or more embodiments.

Turning now to FIG. 1B, another example of an information handling system is illustrated, according to one or more embodiments. In one or more embodiments, an information handling system may include one or more fans. For example, IHS 110 may include fans 134A-134D. Although IHS 110 is shown as including fans 134A-134D, IHS 110 may include any number of fans 134, according to one or more embodiments. In one or more embodiments, fans 134A and 134B may be respectively located at or near (e.g., within five centimeters) air ports 136A and 136B of IHS 110. For example, air ports 136A and 136B may be or may include air inlets. In one instance, sensors 132A and 132B may be respectively located at or near (e.g., within five centimeters) air ports 136A and 136B. In another instance, sensors 132A and 132B may be respectively located at or near fans 134A and 134B.

In one or more embodiments, fans 134C and 134D may be respectively located at or near (e.g., within five centimeters) air ports 136C and 136D of IHS 110. For example, air ports 136C and 136D may be or include air outlets. In one instance, sensors 132C and 132D may be respectively located at or near (e.g., within five centimeters) air ports 136C and 136D. In another instance, sensors 132C and 132D may be respectively located at or near fans 134C and 134D. In one or more embodiments, an airport 136 may include a grate, a grill, and/or a screen, among others. In one or more embodiments, a grate, a grill, and/or a screen may be on or near an airport 136. In one or more embodiments, a grate, a grill, and/or a screen may prevent or may mitigate debris, fingers, pens, and/or other material from entering IHS 110. In one or more embodiments, a grate, a grill, and/or a screen may become blocked, clogged, congested, and/or occluded. For example, if a grate, a grill, and/or a screen becomes blocked, clogged, congested, and/or occluded, airflow through an airport 136 may become reduced. For instance, if airflow through an airport 136 becomes reduced a temperature value change at or near airport 136 may occur. In one or more embodiments, if airflow through an airport 136 becomes reduced temperature values associated with a component of IHS 110 may increase over a period of time.

Figure 1C:
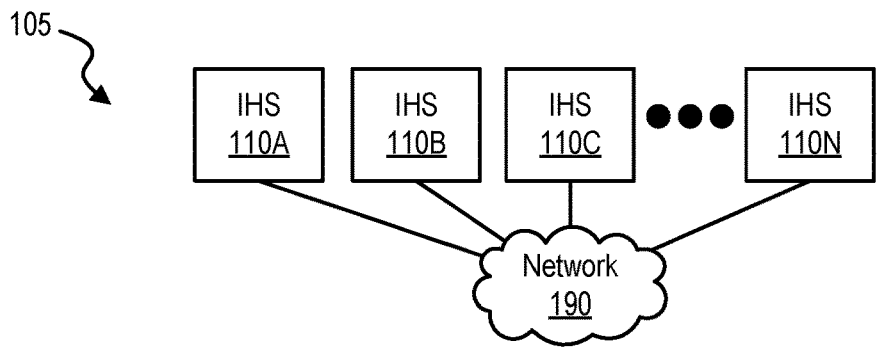
FIG. 1C illustrates an example of a system of information handling systems, according to one or more embodiments.

Turning now to FIG. 1C, an example of a system of information handling systems is illustrated, according to one or more embodiments. In one or more embodiments, a system of information handling systems may include multiple information handling systems. For example, a system of information handling systems 105 may include multiple information handling systems (IHSs) 110A-110N. Although system of information handling systems 105 is shown as including IHSs 110A-110N, system of information handling systems 105 may include any number of information handling systems, according to one or more embodiments. In one or more embodiments, IHSs 110A-110N may be communicatively coupled to a network 190. In one or more embodiments, a server cluster may be or may include system of information handling systems 105. For example, nodes of the server cluster may be or may include IHSs 110A-110N.

In one or more embodiments, network 190 may include a wired network, a wireless network, an optical network, or a combination of the foregoing, among others. For example, network 190 may include and/or be coupled to various types of communications networks. For instance, network 190 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, system of information handling systems 105 may include network 190. In one or more embodiments, system of information handling systems 105 may not include network 190.

In one or more embodiments, IHSs 110A-110N may be located in a server room. For example, IHSs 110A-110N may be cooled by a cooling system associated with the server room. In one or more embodiments, the server room may include "cold" isles and "hot" isles. For example, an IHS 110 may be located in a rack in the server room. For instance, a cold isle of the server room may be associated with a first side of the rack, and a hot isle of the server room may be associated with a second side of the rack. As an example, an air inlet of IHS 110 may intake air via the first side of the rack (e.g., intake air from the cold isle), and an air outlet of IHS 110 may exhaust air from IHS 110 via the second side of the rack (e.g., exhaust air to the hot isle).

Figure 2:
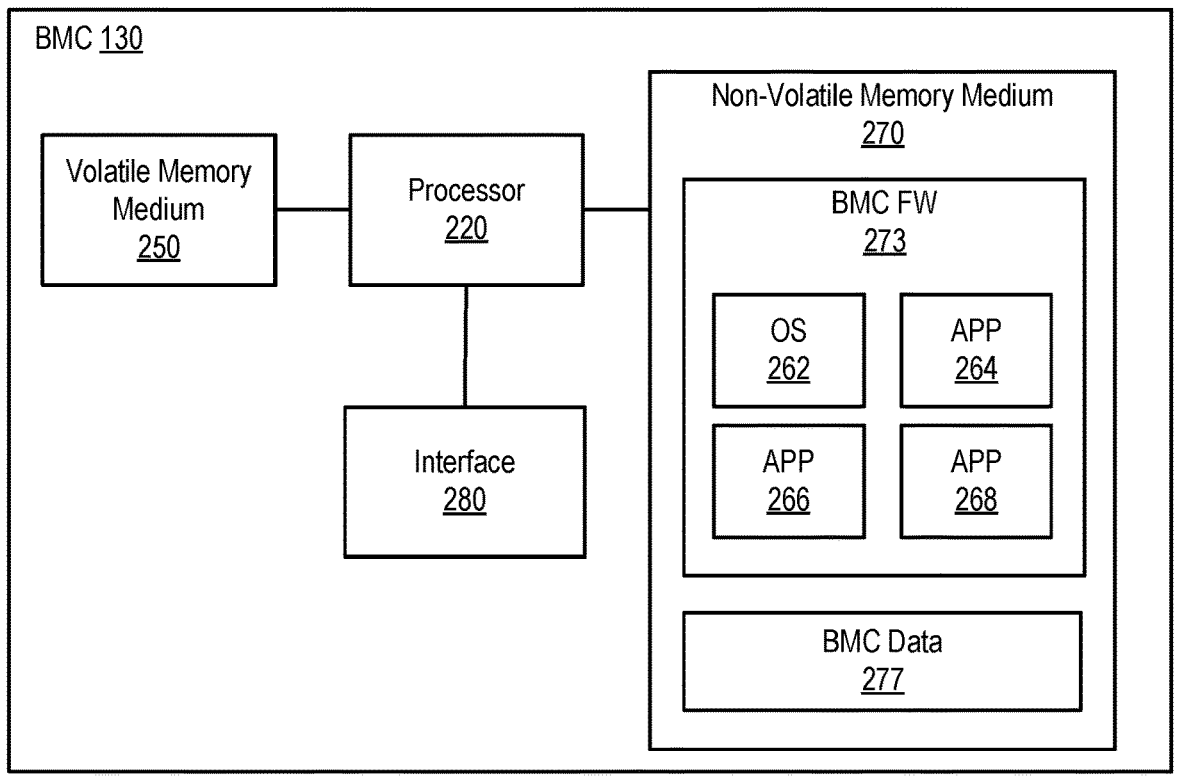
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). For instance, a sensor 132 may be communicatively coupled to interface 280. In a third example, interface 280 may include circuitry that enables communicatively coupling to one or more networks. For instance, interface 280 may include circuitry that enables communicatively coupling to network interface 180. In another example, interface 280 may include a network interface. For instance, interface 280 may be coupled to network 190.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Turning now to FIGS. 3A-3D, examples of plots of attributes associated with processing workloads are illustrated, according to one or more embodiments. In one or more embodiments, multiple attributes may be associated with respective multiple axes. In one example, an axis 310A may be associated with time associated with processing a workload. In a second example, an axis 310B may be associated with a fan speed of a fan of IHS 110. For instance, a fan speed may be measured in revolutions per minute (RPM). In another example, an axis 310C may be associated with a ratio of an inlet temperature value to an outlet temperature value. In one instance, the inlet temperature value may be associated with a temperature value at or near an air inlet of IHS 110. In another instance, the outlet temperature value may be associated with a temperature value at or near an air outlet of IHS 110.

In one or more embodiments, a plot 320 may illustrate an ideal fan speed of an IHS 110 along with an ideal ratio of an inlet temperature value to an outlet temperature value of IHS 110 with respect to a first workload processed by IHS 110 over time, according to one or more embodiments. For example, plot 320 may be associated with a golden reference. For instance, the first workload processed by IHS 110 over time may be associated with the golden reference.

Figure 3A:
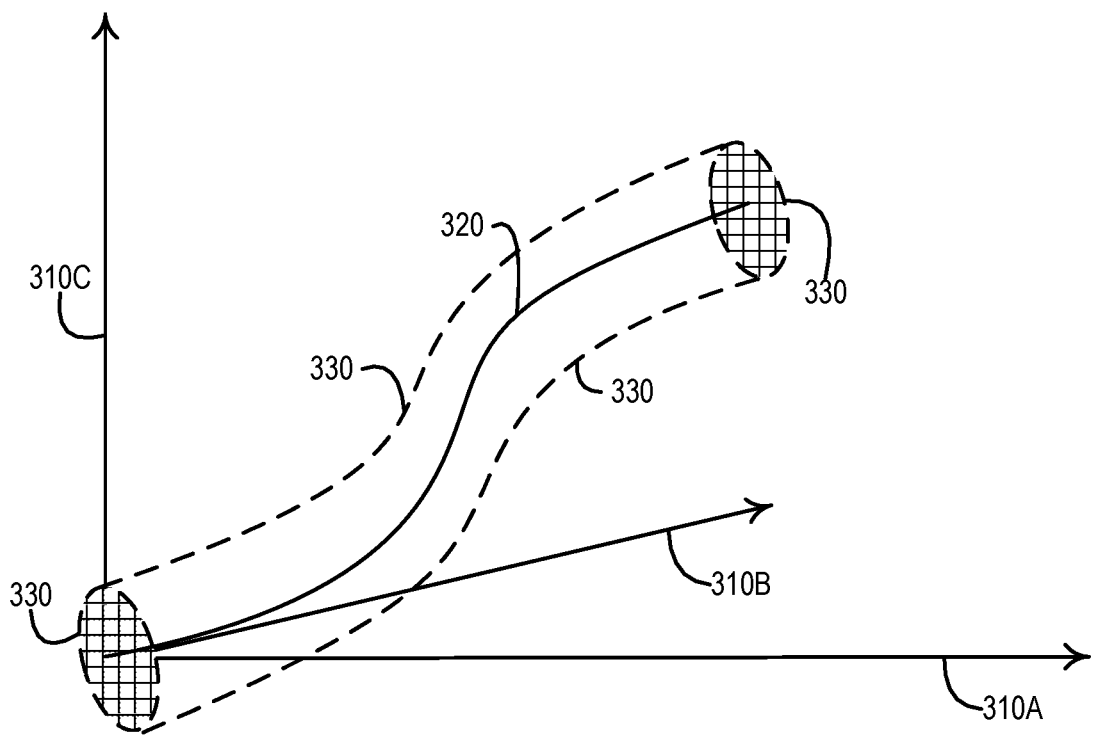
FIGS. 3A-3D illustrate examples of plots of attributes associated with processing workloads, according to one or more embodiments.
Figure 3B:
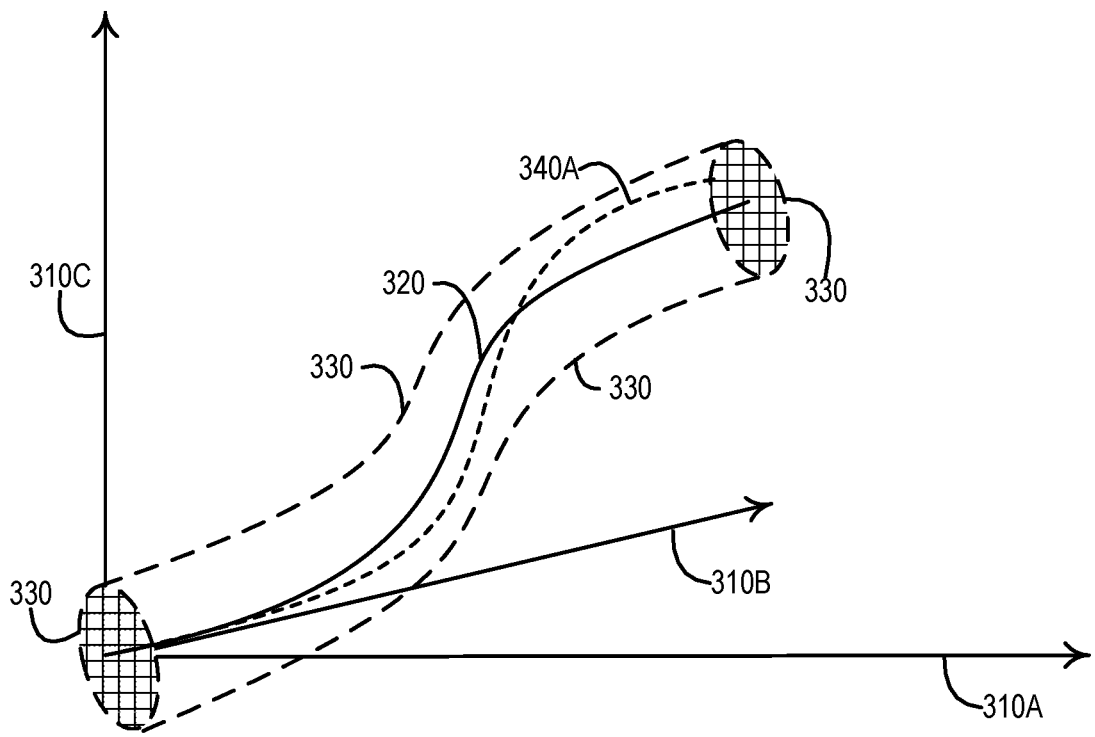
Figure 3C:
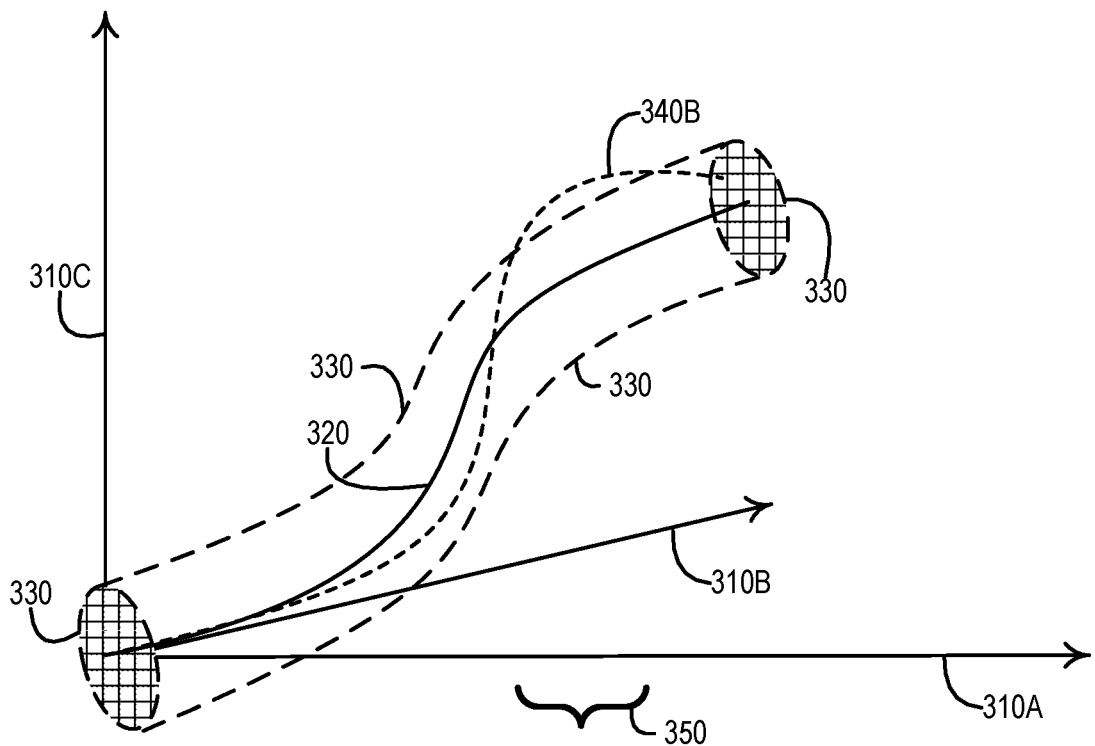

In one or more embodiments, when an IHS 110 processes a workload, a fan speed of a fan of IHS 110 along with a ratio of an inlet temperature value to an outlet temperature value of IHS 110 may be within an allowable variance 330. In one example, as shown in FIG. 3B, a plot 340A may illustrate a fan speed of a fan of IHS 110A along with a ratio of an inlet temperature value to an outlet temperature value of IHS 110A with respect to a second workload processed by IHS 110A over time. For instance, plot 340A may be within allowable variance 330 as IHS 110A processes the second workload. In another example, as illustrated in FIG. 3C, a plot 340B may illustrate a fan speed of a fan of IHS 110B along with a ratio of an inlet temperature value to an outlet temperature value of IHS 110B with respect to a third workload processed by IHS 110B over time. For instance, plot 340B may not be within allowable variance 330 as IHS 110B processes the third workload. As shown, plot 340B may not be within allowable variance 330 during a time period 350 (e.g., an amount of time transpiring). For example, plot 340B illustrates that one or more of the fan speed of the fan of IHS 110B and the ratio of the inlet temperature value to the outlet temperature value of IHS 110B may deviate beyond allowable variance 330. For instance, the one or more of the fan speed of the fan of IHS 110B and the ratio of the inlet temperature value to the outlet temperature value of IHS 110B may deviate beyond allowable variance 330 during time period 350.

In one or more embodiments, plot 340B illustrates that one or more of the fan speed of the fan of IHS 110B and the ratio of the inlet temperature value to the outlet temperature value of IHS 110B may exceed respective variance ranges. In one or more embodiments, an allowable variance 330 may be based at least on multiple variance ranges. In one example, a variance range may include a range of fan speeds of a fan of an IHS 110. In another example, a variance range may include a range of ratios of inlet temperature values to outlet temperature values of an IHS 110.

Figure 3D:
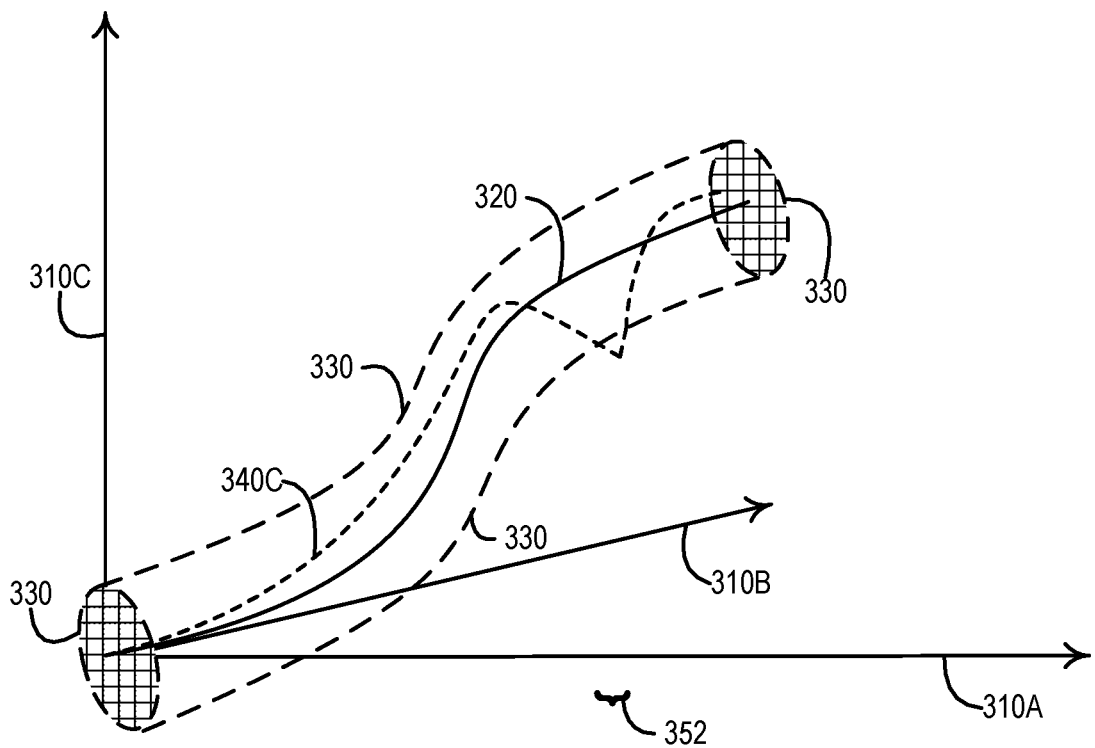

In one or more embodiments, a plot 340C, as shown in FIG. 3D, may illustrate a fan speed of a fan of IHS 110C along with a ratio of an inlet temperature value to an outlet temperature value of IHS 110C with respect to a fourth workload processed by IHS 110C over time. For example, plot 340C may not be within allowable variance 330 as IHS 110C processes the fourth workload. As shown, plot 340C may not be within allowable variance 330 during a time period 352 (e.g., an amount of time transpiring). For example, plot 340C illustrates that one or more of the fan speed of the fan of IHS 110C and the ratio of the inlet temperature value to the outlet temperature value of IHS 110C may deviate beyond allowable variance 330. For instance, the one or more of the fan speed of the fan of IHS 110C and the ratio of the inlet temperature value to the outlet temperature value of IHS 110C may deviate beyond allowable variance 330 during time period 352.

Although FIGS. 3A-3D discuss two attributes with respect to time of processing a workload, any number of attributes with respect to time of processing a workload may be utilized, according to one or more embodiments. For example, another attribute with respect to time of processing a workload that may be utilized may include a temperature value of a processor 120 of an IHS 110. For instance, a variance range may include a range of temperature values of a processor 120 of an IHS 110.

Figure 4:
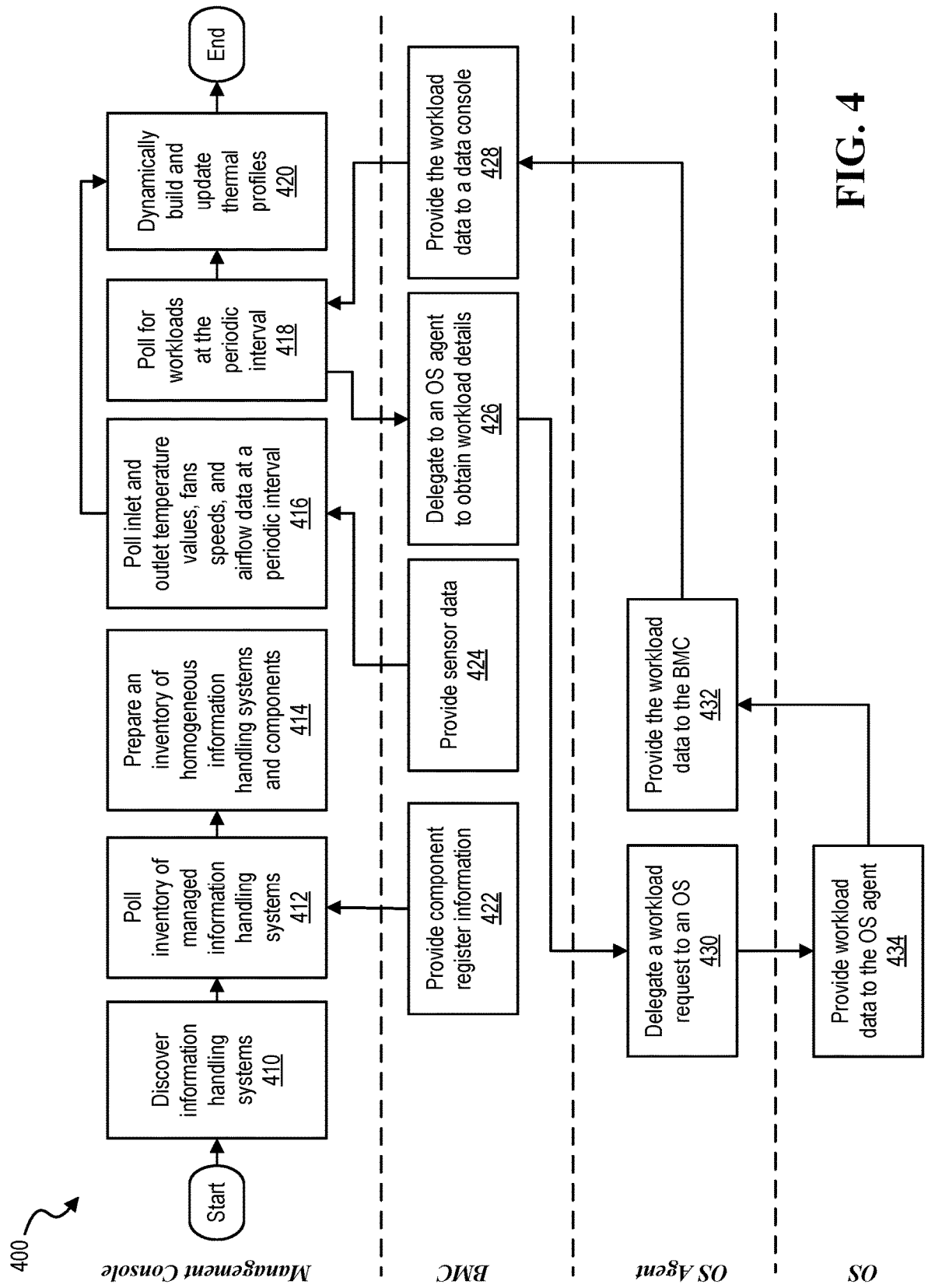
FIG. 4 illustrates an example of a system that includes multiple processes utilized by a system of information handling systems, according to one or more embodiments.

Turning now to FIG. 4, an example of a system that includes multiple processes utilized by a system of information handling systems, according to one or more embodiments. In one or more embodiments, a system 400 may include multiple processes 410-434. In one or more embodiments, a process 410 of a management console may discover information handling systems of a system. For example, process 410 may discover nodes of a server cluster. For instance, process 410 may discover IHSs 110A-110N of system of information handling systems 105. In one or more embodiments, the management console may be implemented via an IHS 110, which may or may not be included in IHSs 110A-110N. For example, the management console may include multiple software tools. For instance, the management console may include multiple software tools may be utilized to manage a server cluster. As an example, the management console may work with a cluster manager of the server cluster. For instance, the multiple software tools of the management console may be utilized to interface with, to communicate with, and/or to work with the cluster manager. In one or more embodiments, the cluster manager may be communicatively coupled to IHSs 110A-110N. For example, the cluster manager may be communicatively coupled to IHSs 110A-110N via network 190. In one or more embodiments, system 105 may include the cluster manager.

In one or more embodiments, the management console may provide platform-level data to the cluster manager. For example, the platform-level data may include inventory data associated with one or more of IHSs 110A-110N of system 105 and/or information handling system performance data associated with one or more of IHSs 110A-110N of system 105, among others. In one or more embodiments, the cluster manager may be implemented via an IHS 110, which may or may not be included in IHSs 110A-110N. In one or more embodiments, a process 412 of the management console may poll inventory of managed information handling systems. For example, process 412 may poll inventory of IHSs 110A-110N. For instance, polling inventory of IHSs 110A-110N may include polling each BMC 130 of IHSs 110A-110N for inventory information associated with each IHS 110. As an example, a process 422 of a BMC 130 of an IHS 110 may provide component register information to process 412. For instance, component register information may include information associated with components of an IHS 110. In one or more embodiments, an inventory of an IHS 110 may include information associated with components of IHS 110. For example, the components of IHS 110 may include processor 120, BMC 130, sensors 132A-132D, fans 134A-134D, volatile memory medium 150, non-volatile memory medium 160, non-volatile memory medium 170, and network interface 180, among others.

In one or more embodiments, process 412 may provide the inventory information associated with each IHS 110 of IHSs 110A-110N to a process 414 of the management console. For example, process 414 may prepare an inventory of homogeneous information handling systems and components based at least on the inventory information associated with each IHS 110 of IHSs 110A-110N. For instance, the inventory of homogeneous information handling systems and components may include an inventory of at least a portion of IHSs 110A-110N. As an example, the at least the portion of IHSs 110A-110N may include components of a same make and model. In one or more embodiments, the at least a portion of IHSs 110A-110N may be a subset of IHSs 110A-110N. In one or more embodiments, the at least a portion of IHSs 110A-110N may be all of IHSS 110A-110N.

In one or more embodiments, a process 416 of the management console may poll inlet and outlet temperature values, fans speeds, and air flow data at a periodic interval. For example, process 416 may poll inlet and outlet temperature values, fans speeds, and air flow data at a periodic interval of each IHS 110 of the at least the portion of IHSs 110A-110N. For instance, a process 424 of a BMC 130 of each IHS 110 of the at least the portion of IHSs 110A-110N may provide sensor data to process 416. As an example, the sensor data may include inlet and outlet temperature values, fans speeds, and airflow data. An another example, the sensor data may include information utilizable by process 416 to determine inlet and outlet temperature values, fans speeds, and airflow data.

In one or more embodiments, a process 418 of the management console may poll for workloads at the periodic interval. For example, process 418 may poll a process 426 of each BMC 130 of each IHS 110 of the at least the portion of IHSs 110A-110N for workloads at the periodic interval. For instance, process 426 may delegate to an OS agent (e.g., a host OS agent) to obtain workload details. As an example, the OS agent may include instructions executable by a processor 120. For instance, the OS agent may include an APP of APPs 164-168. In one or more embodiments, the OS agent may determine hardware metrics and OS-level metrics associated with an IHS 110 that executes the OS agent.

In one or more embodiments, a process 430 of the OS agent may delegate a workload request to an OS. For example, process 430 may delegate a workload request to OS 162. In one or more embodiments, a process 434 of the OS determine the OS-level metrics associated with the workload. For example, the OS-level metrics associated with the workload may include information associated with processor and memory utilization, among others, as the workload is processed. In one or more embodiments, process 434 may provide workload data to the OS agent. For example, process 434 of the OS may provide the workload data to a process 432 of the OS agent. In one or more embodiments, the workload data may include information associated with processor and memory utilization, among others. In one or more embodiments, process 432 may provide the workload data to the BMC. For example, process 432 may provide the workload data to BMC 130. In one or more embodiments, a process 428 of the BMC may provide the workload data to a data console. For example, process 428 of BMC 130 may provide the workload data to process 418.

In one or more embodiments, process 416 may provide the inlet and outlet temperature values, the fans speeds, and the air flow data associated with the at least the portion of IHSs 110A-110N to a process 420 of the management console, and process 418 may provide the workload data associated with the at least the portion of IHSs 110A-110N to process 420. For example, process 420 may dynamically build and update thermal profiles associated with the at least the portion of IHSS 110A-110N. In one or more embodiments, process 420 may perform an inference based at least on the thermal profiles associated with the at least the portion of IHSs 110A-110N. For example, process 420 may infer a potential deviation from thermal characteristics, which may trigger an alert. For instance, the alert may be associated with an obstruction in a desired airflow, an aging of thermal heat paste, etc.

In one or more embodiments, catching a deviation early may be a proactive measure to detect an increase in a cooling power requirement for an IHS 110 of the at least the portion of IHSs 110A-110N. For example, in response to the cluster manager receiving the alert, the cluster manager may perform one or more appropriate actions. In one instance, the one or more appropriate actions may include not loading an affected IHS 110 of the at least the portion of IHSS 110A-110N with an additional workload. In a second instance, the one or more appropriate actions may include transferring a workload from an affected IHS 110 of the at least the portion of IHSs 110A-110N to another IHS 110 of the at least the portion of IHSs 110A-110N, which is not affected. In a third instance, the one or more appropriate actions may include transferring a portion of a workload from an affected IHS 110 of the at least the portion of IHSs 110A-110N to another IHS 110 of the at least the portion of IHSs 110A-110N, which is not affected. In another instance, the one or more appropriate actions may include transferring a virtual machine from an affected IHS 110 of the at least the portion of IHSS 110A-110N to another IHS 110 of the at least the portion of IHSs 110A-110N, which is not affected. In one or more embodiments, after each IHS 110 of the at least the portion of IHSs 110A-110N are within a standard thermal profile, a user (e.g., an administrator) may inspect the at least the portion of IHSs 110A-110N and may adjust or readjust an allowable variance (e.g., allowable variance 330).

In one or more embodiments, a workload may include processing multiple queries received via network 190. In one example, in response to the cluster manager receiving the alert, the cluster manager may not permit an affected IHS 110 of the at least the portion of IHSs 110A-110N to respond to the multiple queries. In another example, in response to the cluster manager receiving the alert, the cluster manager may not permit an affected IHS 110 of the at least the portion of IHSs 110A-110N to respond any more queries.

Figure 5:
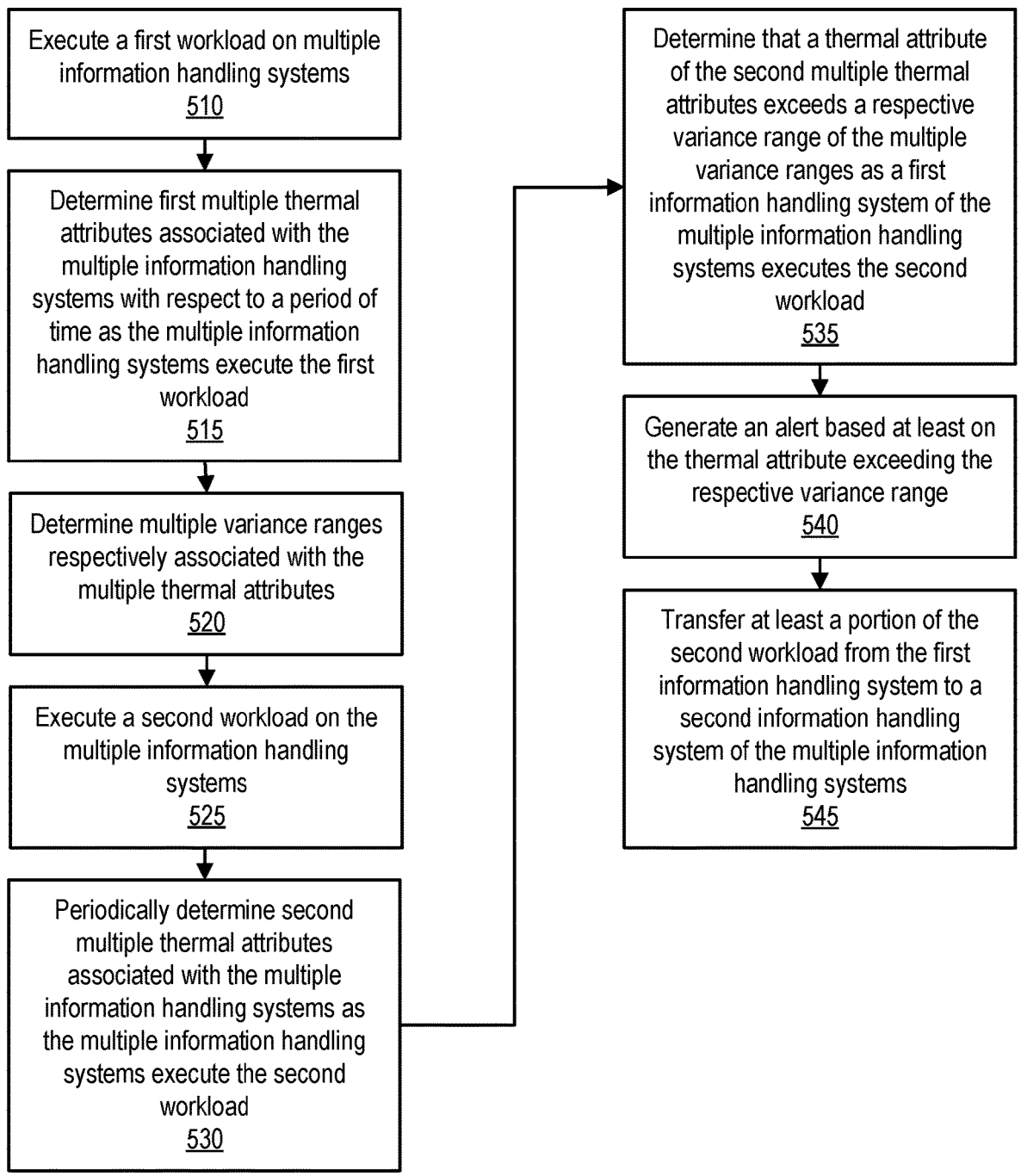
FIG. 5 illustrates an example of a method of operating a system of information handling systems, according to one or more embodiments.

Turning now to FIG. 5, an example of a method of operating a system of information handling systems is illustrated, according to one or more embodiments. At 510, a first workload may be executed on multiple information handling systems. For example, IHSs 110A-110N may execute a first workload. For instance, the first workload may be associated with a golden profile. In one or more embodiments, a golden reference may be determined via executing the first workload on the multiple information handling systems. For example, the golden reference may be determined via executing the first workload on at least a portion of IHSs 110A-110N, which are homogenous.

At 515, first multiple thermal attribute values associated with the multiple information handling systems may be determined with respect to a period of time as the multiple information handling systems execute the first workload. For example, the first multiple thermal attribute values may be associated with the golden profile. For instance, the first multiple thermal attribute values may be plotted via plot 320 (shown in FIG. 3A). In one or more embodiments, a cluster manager may determine first multiple thermal attribute values associated with the multiple information handling systems with respect to a period of time as the multiple information handling systems execute the first workload. In one or more embodiments, baseboard management controllers (BMCs) 130 respectively associated with IHSs 110A-110N may determine first multiple thermal attribute values associated with the multiple information handling systems with respect to a period of time as the multiple information handling systems execute the first workload. For example, BMCs 130 respectively associated with IHSs 110A-110N may provide, to the cluster manager, the first multiple thermal attribute values associated with the multiple information handling systems with respect to the period of time as the multiple information handling systems execute the first workload.

At 520, multiple variance ranges respectively associated with the multiple thermal attribute values may be determined. For example, the cluster manager may determine multiple variance ranges respectively associated with the multiple thermal attribute values. In one or more embodiments, allowable variance 330 (shown in FIGS. 3A-3D) may be associated with the multiple variance ranges respectively associated with the multiple thermal attribute values. At 525, the multiple information handling systems may execute a second workload. For example, IHSs 110A-110N may execute a second workload. For instance, the at least the portion of IHSs 110A-110N, which are homogenous, may execute the second workload.

At 530, second multiple thermal attribute values associated with the multiple information handling systems may be determined as the multiple information handling systems execute the second workload. In one example, the cluster manager may periodically determine second multiple thermal attribute values associated with the multiple information handling systems as the multiple information handling systems execute the second workload. In another example, BMCs 130 respectively associated with IHSs 110A-110N may periodically determine second multiple thermal attribute values associated with the multiple information handling systems as the multiple information handling systems execute the second workload. For instance, BMCs 130 respectively associated with IHSs 110A-110N may provide the second multiple thermal attribute values associated with the multiple information handling systems to the cluster manager.

As one example, second multiple thermal attribute values associated with IHS 110A as IHS 110A executes the second workload may be represented via plot 340A (shown in FIG. 3B). As a second example, second multiple thermal attribute values associated with IHS 110B as IHS 110B executes the second workload may be represented via plot 340B (shown in FIG. 3C). As another example, second multiple thermal attributes associated with IHS 110C as IHS 110C executes the second workload may be represented via plot 340C (shown in FIG. 3D).

At 535, it may be determined that a thermal attribute value of the second multiple thermal attribute values exceeds a respective variance range of the multiple variance ranges as a first information handling system of the multiple information handling systems execute the second workload. In one example, the cluster manager may determine that a thermal attribute value of the second multiple thermal attribute values exceeds a respective variance range of the multiple variance ranges as a first information handling system of the multiple information handling systems executes the second workload. In a second example, a baseboard management controller of a first information handling system of the multiple information handling systems may determine that a thermal attribute value of the second multiple thermal attribute values exceeds a respective variance range of the multiple variance ranges as the first information handling system executes the second workload.

As an example, when a thermal attribute value of the second multiple thermal attribute values exceeds a respective variance range of the multiple variance ranges as the first information handling system executes the second workload, plot 340B may exceed allowable variance 330 (shown in FIG. 3C). For instance, plot 340B may exceed allowable variance 330 for period of time 350. As another example, when a thermal attribute value of the second multiple thermal attribute values exceeds a respective variance range of the multiple variance ranges as the first information handling system executes the second workload, plot 340C may exceed allowable variance 330 (illustrated in FIG. 3D). For instance, plot 340C may exceed allowable variance 330 for period of time 352.

In one or more embodiments, period of time 352 may not exceed a threshold of time to generate an alert. For example, plot 340C exceeding allowable variance 330 for period of time 352 may be an aberrant spike or an anomaly in executing a workload. In one or more embodiments, period of time 350 may exceed the threshold of time to generate an alert. For example, plot 340B exceeding allowable variance 330 for period of time 350 may not be an aberrant spike in executing a workload or may not be an anomaly in executing a workload.

At 540, an alert may be generated based at least on the thermal attribute value exceeding the respective variance range. In one example, the cluster manager may generate an alert based at least on the thermal attribute value exceeding the respective variance range. In another example, a baseboard management controller of the first information handling system may generate an alert based at least on the thermal attribute value exceeding the respective variance range. For instance, the baseboard management controller of the first information handling system may provide the alert to the cluster manager. In one or more embodiments, generating the alert based at least on the thermal attribute value exceeding the respective variance range may be performed in response to determining that the thermal attribute value of the second multiple thermal attribute values exceeds the respective variance range.

At 545, at least a portion of the second workload may be transferred from the first information handling system to a second information handling system of the multiple information handling systems. For example, the cluster manager may transfer at least a portion of the second workload from the first information handling system to a second information handling system of the multiple information handling systems. In one or more embodiments, transferring the at least the portion of the second workload from the first information handling system to the second information handling system may be performed in response to the alert.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
    a plurality of information handling systems; and
    a cluster manager communicatively coupled to the plurality of information handling systems;
    wherein a first information handling system of the plurality of information handling systems is configured to:
        execute a first workload, the first workload associated with a first workload-based thermal profile;
    wherein the cluster manager is configured to:
        determine a first thermal profile associated with the first workload based on i) the first workload-based thermal profile and ii) a first plurality of thermal attribute values associated with the first information handling system with respect to a period of time as the first information handling system executes the first workload, the first plurality of thermal attribute values associated respectfully with a plurality of variance ranges;
    wherein a second information handling system of the plurality of information handling systems is further configured to:
        execute a second workload, the second workload associated with a second workload-based thermal profile, the second workload executed after execution of the first workload; and
    wherein the cluster manager is further configured to:
        determine a second thermal profile associated with the second workload based on i) the second workload-based thermal profile and ii) a second plurality of thermal attribute values associated with the second information handling system as the second information handling system executes execute the second workload;
        determine that a thermal attribute value of the second plurality of thermal attribute values exceeds a respective variance range of the plurality of variance ranges as the second information handling system of the plurality of information handling systems executes the second workload;
        in response to determining that the thermal attribute value of the second plurality of thermal attribute values exceeds the respective variance range, generate an alert based at least on the thermal attribute value exceeding the respective variance range; and
        in response to the alert, transfer at least a portion of the second workload from the second information handling system to the first information handling system of the plurality of information handling systems,
        wherein the first workload-based thermal profile and the second workload-based thermal profile are the same.

2. The system of claim 1, wherein, to transfer the at least the portion of the second workload from the second information handling system to the first information handling system, the cluster manager is further configured to transfer the second workload from the second information handling system to the first information handling system.

3. The system of claim 2, wherein the second workload includes a virtual machine.

4. The system of claim 1, wherein the thermal attribute value of the second plurality of thermal attribute values includes a fan speed of a fan of the second information handling system, a temperature value of a processor of the second information handling system, or a ratio of an inlet temperature value to an outlet temperature value associated with the second information handling system.

5. The system of claim 4,
    wherein the thermal attribute value of the second plurality of thermal attribute values includes the ratio of the inlet temperature value to the outlet temperature value associated with the second information handling system;
    wherein the second information handling system includes a plurality of sensors;
    wherein a first sensor of the plurality of sensors is located at or near an air inlet of the second information handling system and is configured to determine the inlet temperature value; and
    wherein a second sensor of the plurality of sensors is located at or near an air outlet of the second information handling system and is configured to determine the outlet temperature value.

6. The system of claim 1, wherein a cluster includes the plurality of information handling systems.

7. The system of claim 1,
    wherein the plurality of information handling systems includes a respective plurality of baseboard management controllers;
    wherein the cluster manager is further configured to:
        provide, to the plurality of baseboard management controllers, a plurality of requests to the plurality of baseboard management controllers for a plurality of inventories respectively associated with the plurality of information handling systems; and
        receive the plurality of inventories respectively associated with the plurality of information handling systems.

8. The system of claim 7, wherein the cluster manager is further configured to:
provide the plurality of variance ranges to the plurality of baseboard management controllers.

9. The system of claim 1, wherein the cluster manager is further configured to:
in response to the alert, provide a message to a user indicating that the thermal attribute value of the second plurality of thermal attribute values exceeds the respective variance range.

10. The system of claim 1, wherein, to determine that the thermal attribute value of the second plurality of thermal attribute values exceeds the respective variance range, the cluster manager is further configured to determine that the thermal attribute value of the second plurality of thermal attribute values exceeds the respective variance range for an amount of time transpiring.

11. A method, comprising:
executing a first workload at a first information handling system, the first workload associated with a first workload-based thermal profile;
determining first thermal profile associated with the first workload based on i) the first workload-based thermal profile and ii) a first plurality of thermal attribute values associated with the first information handling system with respect to a period of time as the first information handling system executes the first workload, the first plurality of thermal attribute values associated respectfully with a plurality of variance ranges;
executing a second workload at a second information handling system, the second workload associated with a second workload-based thermal profile, the second workload executed after execution of the first workload;
determining a second thermal profile associated with the second workload based on i) the second workload-based thermal profile and ii) second plurality of thermal attribute values associated with the second information handling system as the second information handling system executes the second workload;
determining that a thermal attribute value of the second plurality of thermal attribute values exceeds a respective variance range of the plurality of variance ranges as the second information handling system of the plurality of information handling systems executes the second workload;
in response to the determining that the thermal attribute value of the second plurality of thermal attribute values exceeds the respective variance range, generating an alert based at least on the thermal attribute value exceeding the respective variance range; and
in response to the alert, transferring at least a portion of the second workload from the second information handling system to the first information handling system of the plurality of information handling systems, wherein the first workload-based thermal profile and the second workload-based thermal profile are the same.

12. The method of claim 11, wherein the transferring the at least the portion of the second workload from the second information handling system to the first information handling system includes transferring the second workload from the second information handling system to the first information handling system.

13. The method of claim 12, wherein the second workload includes a virtual machine.

14. The method of claim 11, wherein the thermal attribute value of the second plurality of thermal attribute values includes a fan speed of a fan of the second information handling system, a temperature value of a processor of the second information handling system, or a ratio of an inlet temperature value to an outlet temperature value associated with the second information handling system.

15. The method of claim 14,
wherein the thermal attribute value of the second plurality of thermal attribute values includes the ratio of the inlet temperature value to the outlet temperature value associated with the second information handling system;
wherein the second information handling system includes a plurality of sensors;
wherein a first sensor of the plurality of sensors is located at or near an air inlet of the second information handling system and is configured to determine the inlet temperature value; and
wherein a second sensor of the plurality of sensors is located at or near an air outlet of the second information handling system and is configured to determine the outlet temperature value.

16. The method of claim 11,
wherein a cluster includes the plurality of information handling systems;
wherein the cluster includes a cluster manager; and
wherein the transferring the at least the portion of the second workload from the first information handling system to the second information handling system includes the cluster manager transferring the at least the portion of the second workload from the first information handling system to the second information handling system in response to the alert.

17. The method of claim 16,
wherein the first information handling system includes a baseboard management controller; and
wherein the determining that the thermal attribute value of the second plurality of thermal attribute values exceeds the respective variance range includes the baseboard management controller determining that the thermal attribute value of the second plurality of thermal attribute values exceeds the respective variance range;
the method further comprising:
providing, by the baseboard management controller, the alert to the cluster manager.

18. The method of claim 17, further comprising:
providing, by the cluster manager, providing the plurality of variance ranges to the baseboard management controller.

19. The method of claim 11, further comprising:
in response to the alert, providing a message to a user indicating that the thermal attribute value of the second plurality of thermal attribute values exceeds the respective variance range.

20. The method of claim 11, wherein the determining that the thermal attribute value of the second plurality of thermal attribute values exceeds the respective variance range includes determining that the thermal attribute value of the second plurality of thermal attribute values exceeds the respective variance range for an amount of time transpiring.

* * * * *

UNITED STATES PATENT AND TRADEMARK OFFICE
CERTIFICATE OF CORRECTION

| | | |
|---|---|---|
| PATENT NO. | : 12,164,974 B2 | Page 1 of 1 |
| APPLICATION NO. | : 17/443918 | |
| DATED | : December 10, 2024 | |
| INVENTOR(S) | : Ravishankar N. Kanakapura et al. | |

It is certified that error appears in the above-identified patent and that said Letters Patent is hereby corrected as shown below:

On the Title Page

Item (54) and in the Specification, Column 1, Lines 1-4:
MANAGING WORKLOAD EXECUTION ACROSS MULTIPLEDIFFERING INFORMATION HANDLING SYSTEMS UTILIZINGTHERMAL PROFILES Should read:
-- MANAGING WORKLOAD EXECUTION ACROSS MULTIPLE DIFFERING INFORMATION HANDLING SYSTEMS UTILIZING THERMAL PROFILES --

Signed and Sealed this
Fourteenth Day of January, 2025

Derrick Brent
*Acting Director of the United States Patent and Trademark Office*